(12) United States Patent
Tabota et al.

(10) Patent No.: US 6,447,925 B1
(45) Date of Patent: Sep. 10, 2002

(54) HEAT-SHRINKABLE POLYESTER FILMS

(75) Inventors: Norimi Tabota, Inuyama (JP); Masatoshi Hashimoto, Inuyama (JP); Seizo Takabayashi, Inuyama (JP); Hiroshi Nagano, Inuyama (JP); Atsuhiko Ohtsuka, Tokyo (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/678,384

(22) Filed: Oct. 3, 2000

(30) Foreign Application Priority Data

Oct. 4, 1999 (JP) ............................................ 11-283232

(51) Int. Cl.$^7$ ......................... B32B 27/36; B32B 27/06
(52) U.S. Cl. ...................... 428/480; 428/34.9; 428/910; 106/13
(58) Field of Search ................................ 428/480, 910, 428/34.9, 35.1; 106/13

(56) References Cited

U.S. PATENT DOCUMENTS

| | | | |
|---|---|---|---|
| 2,923,132 A | * | 2/1960 | Richards, Jr. ............... 188/152 |
| 3,903,294 A | | 9/1975 | Abella |
| 4,020,141 A | * | 4/1977 | Quinn et al. ................ 264/212 |

FOREIGN PATENT DOCUMENTS

| JP | 192464 | * | 7/1996 |
| WO | WO 95/00326 | | 1/1995 |

* cited by examiner

Primary Examiner—Vivian Chen
(74) Attorney, Agent, or Firm—Morrison & Foerster LLP

(57) ABSTRACT

A heat-shrinkable polyester film having a shrinkability in hot water (hereinafter referred to as a hot-water shrinkability) at 95° C. for 10 seconds ranging from 30% to 50% in at least one direction (hereinafter referred to as direction (A)) and ranging from 25% to 45% in a direction (hereinafter referred to as direction (B)) perpendicular to said at least one direction, wherein a difference $\Delta HS$ between the hot-water shrinkability in direction (A) and the hot-water shrinkability in direction (B) (ie., $\Delta HS=|\text{hot-water shrinkability in direction (A)}-\text{hot-water shrinkability in direction (B)}|$) is 10% or smaller, is useful as a wrapping material, mainly as a covering material for the openings of vessels used for packing noodles, puddings, salads, and other foods.

4 Claims, No Drawings

HEAT-SHRINKABLE POLYESTER FILMS

FILED OF INVENTION

The present invention relates to heat-shrinkable polyester films and more particularly to heat-shrinkable polyester films that are useful as wrapping materials, mainly as covering materials for the openings of vessels used for packing noodles, puddings, salads, and other foods.

BACKGROUND OF THE INVENTION

For heat-shrinkable films, particularly shrinkable films as the labels on the bodies of bottles, polyvinyl chloride films, polystyrene films, and other polymer films have been widely used. Some problems, however, have been raised, including the evolution of chlorine-containing gases in the incineration of waste polyvinyl chloride films, difficulty in printing on polystyrene films, and need of separating the labels of resins other than polyethylene terephthalate (PET) in the recycling of PET bottles. Heat-shrinkable polyester films therefore have lately drawn considerable attention.

The polyester heat-shrinkable films have higher strength than the films of other materials, but on the other hand, they exhibit great shrinkage stress when shrunk, so that they may often deform objects to be brought into close contact therewith, such as plastic vessels or aluminum vessels, by heat shrinkage. In particular, when heat-shrinkable polyester films are used as covering materials on vessels, there has been raised a problem that the vessels are easily deformed, if the shrinkage characteristics of the films exhibit a great anisotropy between the direction of extrusion (i.e., the machine direction) and the direction perpendicular to the machine direction (i.e., the transverse direction) in the extrusion of the films.

Heat-shrinkable films are often used as covering materials for chilled or frozen foods. In this case, low temperatures may cause the condensation of water in the contents on the film surface, resulting in the fogging of the films, and even when transparent films are used, the view of the contents may sometimes be obstructed. Further, when the films are used as covering materials, they are cut into a prescribed shape and then layered, from which state they are taken one by one before placement on the vessels and covering for closure. At that time, the layered films become difficult to come off by static electricity, which may cause a deterioration of workability.

SUMMARY OF THE INVENTION

Under these circumstances the present inventors extensively studied to develop a heat-shrinkable polyester film that will cause very few occurrence of wrinkles, shrinkage spots, and strains after heat shrinkage and that can therefore prevent the deformation of applied objects by shrinkage stress. As a result, they have found that such a heat-shrinkable polyester film can be obtained by the control of heat shrinkage to occur evenly in all the directions, more particularly by the control of shrinkability and shrinkage stress to become substantially even in all the directions, thereby completing the present invention.

Thus the present invention provides a heat-shrinkable polyester film having a shrinkability in hot water (hereinafter referred to as a hot-water shrinkability) at 95° C. for 10 seconds ranging from 30% to 50% in at least one direction (hereinafter referred to as direction (A)) and ranging from 25% to 45% in a direction (hereinafter referred to as direction (B)) perpendicular to said at least one direction, wherein a difference $\Delta HS$ between said hot-water shrinkability in direction (A) and said hot-water shrinkability in direction (B) (ie., $\Delta HS=|$hot-water shrinkability in direction (A)—hot-water shrinkability in direction (B)$|$) is 10% or smaller.

DETAILED DESCRIPTION OF THE INVENTION

The polyester used in the heat-shrinkable polyester film of the present invention is not particularly limited, but it may include polyesters obtained by the reaction of acid components such as terephthalic acid, isophthalic acid, and naphthalenedicarboxylic acids with diol components such as propanediol, butanediol, hexanediol, ethylene glycol, neopentyl glycol, and 1,4-cyclohexane dimethanol. The polyester may preferably contain as the diol components at least one of the diols containing 3 to 6 carbon atoms, such as propanediol, butanediol, hexanediol and neopentyl glycol, and particularly for the purpose of improving shrinkage finish, the polyester may preferably contain neopentyl glycol as one kind of the diol components. Further, the polyester may preferably have a glass transition temperature (Tg) adjusted to 60° C. to 75° C.

The polyester may preferably contain none of diols containing 8 or more carbon atoms, such as octanediol, polyhydric diols such as trimethylolpropane, trimethylolethane, glycerin and diglycerin, and polycarboxylic acids such as trimellitic acid and pyromellitic acid, including their anhydrides. The heat-shrinkable polyester films made of polyesters containing these diols and/or carboxylic acids are difficult to have high heat shrinkability.

Further, when aliphatic carboxylic acids such as adipic acid, sebacic acid and decanedicarboxylic acid are contained as the acid components, the content of aliphatic carboxylic acids may preferably be lower than 3 mol % in all the acid components. The heat-shrinkable polyester films made of polyesters containing these aliphatic carboxylic acids at 3 mol % or higher in all the acid components exhibit a deterioration of toughness needed in the high-speed wrapping.

The polyester may further preferably contain none of diethylene glycol, triethylene glycol and polyethylene glycol as the diol components. In particular, diethylene glycol may often exist as a by-product component in the polymerization of the polyester. In the polyester used in the present invention, the content of at least diethylene glycol may preferably be reduced to lower than 4 mol %.

For the polyester used in the heat-shrinkable polyester film of the present invention, one kind of the above polyesters may be used alone, or two or more kinds of the above polyesters may be used in admixture. In the present invention, when the polyester contains two or more kinds of acid components and/or diol components, the content of these acid components or diol components indicates, whether ester interchange is achieved or not after mixing, the content of acid components or diol components in the polyester as a whole. It is the same with the case where two or more kinds of polyesters are used.

The polyester used in the heat-shrinkable polyester film of the present invention may contain other ingredients to such an extent that they are not harmful to the effects of the present invention, including inorganic and organic lubricants to improve smoothness, colorants, antioxidants, compatibilizers, antistatic agents, ultraviolet light absorbers, and other additives The thickness of the heat-shrinkable polyester film of the present invention is not particularly limited, but it is preferably 10 to 200 μm, more preferably 20 to 100 μm, when the film is used as a shrinkable film for labels.

In the heat-shrinkable polyester film of the present invention, the hot-water shrinkability at 95° C. for 10 seconds in at least one direction (A) should be 30% to 50% and the hot-water shrinkability at 95° C. for 10 seconds in direction (B) perpendicular to the above direction (A) should be 25% to 45%, and ΔHS (where ΔHS=|hot-water shrinkability in direction (A)—hot-water shrinkability in direction (B)|) should be 10% or smaller. If ΔHS is higher than 10%, unevenness of shrinkage occurs in the heat shrinkage to cause the deformation of vessels or other objects for which the heat-shrinkable polyester film of the present invention is used. When the heat-shrinkable polyester film of the present invention is prepared in film shape by extrusion, in which the direction of extrusion in the preparation of said film is taken as the machine direction and the direction perpendicular to the machine direction is taken as the transverse direction, the hot-water shrinkability at 95° C. for 10 seconds may preferably be 30% to 50% in the transverse direction and may preferably be 25% to 45% in the machine direction, and ΔHS (where ΔHS=|hot-water shrink-ability in the transverse direction—hot-water shrinkability in the machine direction|) may preferably be 10% or smaller.

Further, in the heat-shrinkable polyester film of the present invention, the ratio of the maximum shrinkage stress in said direction (A) to the maximum shrinkage stress in said direction (B) (ie., the maximum shrinkage stress in direction (A)/the maximum shrinkage stress in direction (B)) in hot air at 90° C. may preferably be 0.5 to 2.0. When the heat-shrinkable polyester film of the present invention is prepared in film shape by extrusion, the ratio of the maximum shrinkage stress in the transverse direction to the maximum shrinkage stress in the machine direction (i.e., the maximum shrinkage stress in the transverse direction/the maximum shrinkage stress in the machine direction) in hot air at 90° C. may preferably be 0.5 to 2.0. If the above ratio of maximum shrinkage stresses is lower than 0.5 or higher than 2.0, the shrinkage speed in the heat shrinkage and the manner of applying force to vessels or other objects for which the heat-shrinkable polyester film of the present invention is used may vary with the directions of the film (e.g., the machine direction and the transverse direction in the preparation of the film by extrusion), which may easily cause the deformation of vessels or other objects.

The process for producing the heat-shrinkable polyester film of the present invention is not particularly limited, so long as the film can exhibit the above heat-shrink properties, but the film may preferably be stretched, in the step of stretching treatment as described below, at a temperature not lower than the glass transition temperature (Tg) −5° C. but lower than the glass transition temperature (Tg) +15° C. of the polyester used in the film. If the film is stretched at a temperature lower than Tg −5° C. the film is difficult to have the above heat-shrink properties and the resulting film may easily exhibit a deterioration of transparency. If the film is stretched at a temperature not lower than Tg +15° C. the film may easily exhibit a deterioration of toughness needed in the high-speed wrapping and the unevenness of film thickness becomes increased.

Specific examples of the process for producing the heat-shrinkable polyester film of the present invention may include, but are not limited to, the following production process. The polyester used in the present invention is dried with a drying machine such as a hopper dryer or a paddle dryer, or a vacuum dryer, and then extruded in film shape at a temperature of 200° C. to 300° C. For the extrusion, there can be used any of the conventional methods including T-die method and tubular method. After the extrusion, rapid cooling gives an unstretched film. In the present invention, the unstretched film may preferably be treated by stretching, particularly by biaxial stretching both in the machine direction and in the transverse direction.

In the stretching treatment, stretching in the machine direction can be carried out by roll stretching or other known methods. The stretch ratio may preferably be 1.5 to 4.0, and the temperature of stretching can be made the same as the condition for stretching in the transverse direction described below. The stretching in the transverse direction can be carried out by tenter stretching or other known methods. Further, for the purpose of making even the thickness distribution of the heat-shrinkable polyester film, the film may preferably be heated to a prescribed film temperature under a low air flow for achieving a heat transfer coefficient of 0.0013 cal./(cm$^2$.sec.°C.) or lower in the preheating step, which is carried out before the stretching step, when stretched in the transverse direction with a tenter. The stretch ratio in the transverse direction may preferably be 3.0 or higher, more preferably 3.5 or higher. The temperature of stretching may preferably be set at a temperature not lower than the glass transition temperature (Tg) −5° C. but lower than the glass transition temperature +15° C. of the polyester used in the present invention. After that, the film is heat treated, if necessary, at a temperature of 70° C. to 100° C.

In the above stretching treatment, the heat transfer coefficient may preferably be 0.0009 cal./(cm$^2$.sec.°C.) or higher, more preferably 0.0011 to 0.0017 cal./(cm$^2$.sec.°C.) or higher, for the purpose of preventing the internal evolution of heat in the film accompanying the stretching and therefore reducing the unevenness of film temperature in the width direction. If the heat transfer coefficient achieved by an air flow in the above preheating step is higher than 0.0013 cal./(cm$^2$.sec.°C.) and if the heat transfer coefficient in the stretching step is lower than 0.0009 cal./(cm$^2$.sec.°C.), the thickness distribution of the film is difficult to become even; therefore, when the heat-shrinkable polyester film of the present invention is processed by multicolor printing, the deviation of patterns may easily occur in the superposition of these patterns with different colors. In the heat-shrinkable polyester film of the present invention, the thickness distribution may preferably be 6% or lower. The film having a thickness distribution of 6% or lower becomes easy to undergo the superposition of patterns with different colors in the multicolor printing process, which is carried out, for example, when the heat-shrinkable polyester film of the present invention is evaluated for shrinkage finish.

In the biaxial stretching described above as the stretching treatment, the film may be stretched by any method of successive biaxial stretching or simultaneous biaxial stretching, and if necessary, the film may further be stretched again in the machine direction or in the transverse direction.

The heat-shrinkable polyester film of the present invention may preferably have an anti-fogging agent layer on at least one surface thereof. The anti-fogging agent is not particularly limited, so long as it is not harmful to the effects of the present invention, but the anti-fogging agent may preferable be a non-ionic surfactant anti-fogging agent. Specific examples of the non-ionic surfactant anti-fogging agent may include, for example, polyhydric alcohol fatty acid esters, higher fatty acid amines, higher fatty acid amides, and ethylene oxide adducts of higher fatty acid amines or amides. Among these, preferred are polyhydric alcohol fatty acid esters, and more preferred are glycerin fatty acid esters, because they are excellent both in anti-fogging properties and in the recovery of excess anti-fogging agents in the formation of an anti-fogging agent layer, and are further excellent in the antistatic properties of the surface of an anti-fogging agent layer as described below. Further, the anti-fogging agent layer may contain other ingredients that are not harmful to the anti-fogging properties.

In the present invention, the thickness of an anti-fogging agent layer is not particular limited, but it may preferably be 0.001 to 1 g/m², more preferable 0.005 to 0.51 g/m², in which particularly preferred is 0.01 to 0.1 g/m², in a dry state. If the thickness in a dry state is smaller than 0.001 g/m², the anti-fogging agent has no effects, and even an anti-fogging agent, which can provide antistatic properties as described above, has no effects. In contrast, if the thickness in a dry state is greater than 1 g/m², the anti-fogging agent layer becomes sticky or easily causes blocking on the surface thereof.

In the present invention, the method for the formation of an anti-fogging agent layer is not particularly limited, but it may include, for example, a method in which an anti-fogging agent as described above is applied to the surface of a heat-shrinkable polyester film. For the technique for the application of an anti-fogging agent, there can be used gravure coating, reverse kiss coating, fountain bar coating, and other conventional techniques. The application of an anti-fogging agent may be carried out either by an in-line coating method involving application in the preparation of a heat-shrinkable polyester film or by an off-line coating method involving application after the preparation of a heat-shrinkable polyester film; however, for the purpose of improving the adhesion of an anti-fogging agent layer to the film, an in-line coating method is preferred. In the in-line coating method, application may be carried out either to an unstretched film after extrusion or to a uniaxially oriented film after stretching in the machine direction.

Further, the heat-shrinkable polyester film of the present invention may preferably have a surface resistivity at 23° C. and 65% RH ranging from $1\times10^8$ to $1\times10^{13}$ Ω/□ on at least one surface thereof. The method for the control of a surface resistivity in the above range is not particularly limited, but preferred is a method in which the surface resistivity is also controlled by the formation of an anti-fogging agent layer as described above.

EXAMPLES

The present invention will hereinafter be further illustrated by some examples; however, the present invention is not limited to these examples.

The heat-shrinkable polyester films prepared in the following Examples and Comparative Examples were evaluated by the test methods as described below.

(1) Hot-water Shrinkability

A film was cut into a square of 10 cm×10 cm in size so that the direction of extrusion in the preparation was taken as the machine direction (MD), and two sides of the square were made parallel to the machine direction and the other two sides perpendicular to the machine direction (ie., parallel to the transverse direction (TD)). The cut film was then treated by immersion in hot water at 95° C. (the margin of error, −0.5° C. to +0.5° C.) under no load to cause heat shrinkage, followed by the measurement of film sizes both in the machine direction and in the transverse direction to determine the hot-water shrinkability according to the following equation 1.

$$\text{Hot-water shrinkability} = \frac{\text{length before shrinkage} - \text{length after shrinkage}}{\text{length before shrinkage}} \times 100 \text{ (unit: \%)} \qquad \text{Equation 1}$$

(2) ΔHS

From the results of the above test (1), ΔHS was determined (where ΔHS=|hot-water shrinkability in the transverse direction—hot-water shrinkability in the machine direction| (%)).

(3) Maximum Shrinkage Stress Ratio

A film was cut into a rectangle of 200 mm in length along the main shrinkage direction and 20 mm in width, and used as a test piece, in which the direction of the film corresponding to the larger value of hot-water shrinkability determined in the test (1) was taken as the main shrinkage direction. The test piece was attached between the chucks of a tensilon (i e., strength-and-elongation measuring machine with a heating oven) available from Toyo Seiki Co., Ltd. with a chuck distance of 100 mm in an atmosphere previously heated to 90° C. after the interruption of an air blow, followed by the measurement of shrinkage stress detected when the door of the heating oven was rapidly closed and the air blow was restarted. Based on the maximum value obtained from the results of the measurement, the ratio of the maximum shrinkage stress in the transverse direction (TD) to the maximum shrinkage stress in the machine direction (MD) (i.e., the maximum shrinkage stress in the transverse direction/the maximum shrinkage stress in the machine direction) was determined.

(4) Shrinkage Finish

A film was cut into a square of 245 mm×245 mm in size, and the cut film was placed as a covering material on the opening of an aluminum vessel containing Japanese noodles, which vessel has been widely used for frozen Japanese noodles available from Katokichi Co., Ltd. so that the coating-layer formed surface of the film, if any, was faced toward the receiving-portion side of the vessel. A weight was placed on the film, which was then, together with the vessel, allowed to pass though a hot-air tunnel to cause the heat shrinkage of the film. For the evaluation of deformation, the above film had been previously printed with three colors using grass-green, gold, and white inks available from Toyo Ink Mfg. Co., Ltd. The evaluation of shrinkage finish was carried out by visual observation, and the criteria for evaluation were as follows:

No occurrence of wrinkles, vessel deformation, or insufficient shrinkage: ◯

Occurrence of vessel deformation or insufficient shrinkage: X (5) Anti-fogging Properties After the film was allowed to cause heat shrinkage in the above test (4), the vessel containing Japanese noodles was chilled in a refrigerator. The covering material was then evaluated after the chilling for the occurrence of fogging by water condensation in the receiving-portion side of the vessel on the following criteria:

No occurrence of fogging: ◯

Occurrence of fogging (over at least half of the surface): X (6) Surface Resistivity A film was measured on the coating-layer formed surface thereof, if any, for surface resistivity at 23° C. and 65% RH according to JIS K 6911 (the contents thereof are incorporated herein by reference) (the test results are expressed as logarithmic values).

The polyesters used in the following Examples and Comparative Examples were as follows:

Polyethylene terephthalate
 (IV, 0.75; hereinafter referred to as polyester A)

Polyester composed of monomer components containing 70 mol % ethylene glycol and 30 mol % neopentyl glycol as the diol components and terephthalic acid as the acid component.
 (IV, 0.72; hereinafter referred to as polyester B)

Polybutylene terephthalate
 (IV, 1.20; hereinafter referred to as polyester C)

Example 1

A polyester mixture containing 10 wt % polyester A, 66 wt % polyester B, and 24 wt % polyester C was extruded at 280° C. and then rapidly cooled to give an unstretched film. This unstretched film was preheated so that the film temperature came to 83° C. and then stretched between rolls at 98° C. in the machine direction at a ratio of 2.5. To one surface of this film uniaxially stretched in the machine direction, Poem J0021 (polyglycerin fatty acid ester) available from Riken Vitamin Co., Ltd. was applied so that the dry thickness thereof after stretching in the transverse direction came to 0.02 g/m². The film was dried in a preheating zone for stretching in the transverse direction, and then stretched at 81° C. in the transverse direction at a ratio of 4.0, followed by heat treatment at 88° C. to give a heat-shrinkable polyester film of 25 μm in thickness having a coating layer (i.e., a non-ionic surfactant anti-fogging agent layer).

The heat-shrinkable polyester film thus obtained was evaluated by the test methods (1) to (6) as described above. The test results are shown in Table 2.

Examples 2–4, Comparative Examples 1, 2

Each heat-shrinkable polyester film was obtained and evaluated in the same manner as described in Example 1, except that the conditions of stretching both in the machine direction and in the transverse direction, and the thickness of a coating layer were changed as shown in Table 1.

Example 5

A heat-shrinkable polyester film was obtained and evaluated in the same manner as described in Example 1, except that the polyglycerin fatty acid ester was not applied thereto.

Example 6

A heat-shrinkable polyester film was obtained and evaluated in the same manner as described in Example 1, except that the polyester mixture contained 35 wt % polyester A, 55 wt % polyester B, and 10 wt % polyester C, and the temperature of stretching in the machine direction was changed to 100° C.

Comparative Example 3

A heat-shrinkable polyester film was obtained and evaluated in the same manner as described in Example 1, except that polyester A was used at 100 wt %.

TABLE 1

| Items | Conditions of stretching in machine direction | | Conditions of stretching in transverse direction | | Thickness of coating layer (g/m²) |
|---|---|---|---|---|---|
| | Temperature of stretching (° C.) | Stretch ratio | Temperature of stretching (° C.) | Stretch ratio | |
| Example 1 | 98 | 2.5 | 81 | 4.0 | 0.02 |
| Example 2 | 100 | 2.5 | 80 | 3.5 | 0.02 |
| Example 3 | 100 | 3.0 | 79 | 3.0 | 0.02 |
| Example 4 | 98 | 2.5 | 81 | 4.0 | 0.06 |
| Comp. Ex. 1 | 98 | 2.0 | 81 | 5.0 | 0.02 |
| Comp. Ex. 2 | 95 | 4.0 | 79 | 3.0 | 0.02 |
| Example 5 | 98 | 2.5 | 81 | 4.0 | — |
| Example 6 | 100 | 2.5 | 81 | 4.0 | 0.02 |
| Comp. Ex. 3 | 100 | 2.5 | 81 | 4.0 | 0.02 |

TABLE 2

| | Test results | | | | | | |
|---|---|---|---|---|---|---|---|
| | (1) Hot-water shrinkability (%) | | (2) ΔHS | (3) Maximum shrinkage stress ratio | (4) Shrinkage finish | (5) Anti-fogging properties | (6) Surface resistivity [log] (Ω/□) |
| Test objects | MD | TD | (%) | TD/MD | | | |
| Example 1 | 39 | 41 | 2 | 1.6 | ○ | ○ | 9.0 |
| Example 2 | 39 | 39 | 0 | 1.1 | ○ | ○ | 9.5 |
| Example 3 | 42 | 39 | 3 | 0.8 | ○ | ○ | 9.2 |
| Example 4 | 39 | 41 | 2 | 1.6 | ○ | ○ | 9.5 |
| Comp. Ex. 1 | 38 | 50 | 12 | 2.2 | X | ○ | 9.0 |
| Comp. Ex. 2 | 49 | 36 | 13 | 0.4 | X | ○ | 9.0 |
| Example 5 | 39 | 41 | 2 | 1.6 | ○ | — | >16 |
| Example 6 | 40 | 41 | 1 | 1.2 | ○ | ○ | 9.3 |
| Comp. Ex. 3 | 20 | 30 | 10 | 2.0 | X | ○ | 9.2 |

As can be seen form Table 2, all the films of Examples 1–6 exhibited good shrinkage finish, and the films of Examples 1–4, 6 having anti-fogging agent layers had good anti-fogging properties and good antistatic properties. In contrast, the films of Comparative Examples 1–3 had uneven shrinkage characteristics and therefore exhibited poor shrinkage finish, which was not suitable for practical use.

The heat-shrinkable polyester films of the present invention have the advantages that there will cause very few occurrence of wrinkles, shrinkage spots, and strains after heat shrinkage and they can therefore prevent the deformation of applied objects by shrinkage stress, while they are free from the problem of evolving chlorine-containing gases by incineration and they are polyester films having excellent printability. Further, the application of a non-ionic surfactant anti-fogging agent layer makes it possible to prevent the occurrence of fogging by water condensation on the film surface and the deterioration of appearance, even when articles are displayed. When the film surface is given a surface resistivity at 23° C. and 65% RH ranging from $1 \times 10^8$ to $1 \times 10^{13} \Omega/\square$, the films easily come off, even if they are layered, and the films have excellent workability. The heat-shrinkable polyester films of the present invention are therefore useful as wrapping materials, particularly as covering materials.

What is claimed is:

1. A heat-shrinkable polyester film having a shrinkability in hot water (hereinafter referred to as a hot-water shrinkability) at 95° C. for 10 seconds ranging from 30% to 50% in at least one direction (hereinafter referred to as direction (A)) and ranging from 25% to 45% in a direction (hereinafter referred to as direction (B)) perpendicular to said at least one direction, wherein a difference ΔHS between said hot-water shrinkability in direction (A) and said hot-water shrinkability in direction (B) (i.e., ΔHS=|hot-water shrinkability in direction (A)—hot-water shrinkability in direction (B)|) is 10% or smaller, wherein said film comprises a non-ionic surfactant anti-fogging agent layer on at least one surface thereof and wherein said film has a surface resistivity at 23° C. and 65% RH ranging from $1\times10^8 \times 1\times10^{13}$ Ω/☐ on at least one surface thereof.

2. The heat-shrinkable polyester film according to claim 1, wherein the ratio of a maximum shrinkage stress in said direction (A) of the film in hot air at 90° C. to a maximum shrinkage stress in said direction (B) of said film in hot air at 90° C. (i.e., the maximum shrinkage stress in direction (A)/the maximum shrinkage stress in direction (B)) is 0.5 to 2.0.

3. The heat-shrinkable polyester film according to claim 1, wherein said direction (B) corresponds to a direction of extrusion (hereinafter referred to as a machine direction) in the preparation of said film and said direction (A) corresponds to a direction (hereinafter referred to as a transverse direction) perpendicular to the machine direction, wherein said film has a hot-water shrinkability at 95° C. for 10 seconds ranging from 30% to 50% in the transverse direction and ranging from 25% to 45% in the machine direction, and wherein a difference ΔHS between said hot-water shrinkability in the transverse direction and said hot-water shrinkability in the machine direction (i.e., ΔHS=|hot-water shrinkability in the transverse direction—hot-water shrinkability in the machine direction|) is 10% or smaller.

4. The heat-shrinkable polyester film according to claim 3, wherein the ratio of a maximum shrinkage stress in the transverse direction of said film in hot air at 90° C. to a maximum shrinkage stress in the machine direction of said film in hot air at 90° C. (ie., the maximum shrinkage stress in the transverse direction/the maximum shrinkage stress in the machine direction) is 0.5 to 2.0.

* * * * *